(12) United States Patent
Konda et al.

(10) Patent No.: US 12,279,152 B2
(45) Date of Patent: Apr. 15, 2025

(54) DYNAMIC L2 BUFFER SCALING

(71) Applicant: Apple Inc., Cupertino, CA (US)

(72) Inventors: Abhishek Anand Konda, Newark, CA (US); Bobby Jose, San Diego, CA (US); Vijay Venkataraman, San Jose, CA (US)

(73) Assignee: Apple Inc., Cupertino, CA (US)

( * ) Notice: Subject to any disclaimer, the term of this patent is extended or adjusted under 35 U.S.C. 154(b) by 433 days.

(21) Appl. No.: 17/890,408

(22) Filed: Aug. 18, 2022

(65) Prior Publication Data

US 2024/0064560 A1    Feb. 22, 2024

(51) Int. Cl.
*H04W 28/02* (2009.01)
(52) U.S. Cl.
CPC ... *H04W 28/0278* (2013.01); *H04W 28/0247* (2013.01)
(58) Field of Classification Search
None
See application file for complete search history.

(56) References Cited

U.S. PATENT DOCUMENTS

2007/0033301 A1\* 2/2007 Aloni ............ H04L 69/163
710/22
2023/0073796 A1\* 3/2023 Du ............ H04L 69/161

OTHER PUBLICATIONS

3rd Generation Partnership Project; Technical Specification Group Radio Access Network; NR; User Equipment (UE) radio access capabilities (Release17); 3GPP TS 38.306 V17.1.0; Jun. 2022.\*
3rd Generation Partnership Project; Technical Specification Group Radio Access Network; NR; Packet Data Convergence Protocol (PDCP) specification (Release 17); 3GPP TS 38.323 V17.1.0; Jun. 2022.

\* cited by examiner

*Primary Examiner* — Kouroush Mohebbi
(74) *Attorney, Agent, or Firm* — Eschweiler & Potashnik, LLC; Matthew W Glause (57) ABSTRACT

Systems, methods, and circuitries are provided for using an application Layer 2 buffer for reordering out of sequence (OOS) packets when possible to reduce an amount of memory allocated to a baseband (BB) Layer 2 (L2) buffer. In one example, a baseband circuitry of a user equipment (UE), includes BB memory, configured as a BB L2 buffer and one or more BB processors. The BB processors are configured to receive an OOS packet from a physical layer; and in response to an APP L2 buffer status indicating at least a first amount of memory is available, send the OOS packet to APP circuitry for storing in an APP L2 buffer.

20 Claims, 7 Drawing Sheets

DYNAMIC L2 BUFFER SCALING

FIELD

This disclosure relates to wireless communication networks and devices including techniques for ordering packets received on a wireless link.

BACKGROUND

Wireless communication devices receive and process data by way of packet data convergence protocol (PDCP) packets. Each PDCP packet has a header that indicates a sequence number for the packet. The wireless communication device includes a reordering buffer (also referred to as a Layer 2 or L2 buffer). When data is transmitted in the downlink, received packets are stored, and reordered if necessary, in the L2 buffer until a sequence of ordered packets is ready for processing. When data is transmitted in the uplink, transmitted packets are stored in the L2 buffer until a sequence of ordered packets has been acknowledged.

BRIEF DESCRIPTION OF THE DRAWINGS

The present disclosure will be readily understood and enabled by the detailed description and accompanying figures of the drawings. Like reference numerals may designate like features and structural elements. Figures and corresponding descriptions are provided as non-limiting examples of aspects, implementations, etc., of the present disclosure, and references to "an" or "one" aspect, implementation, etc., may not necessarily refer to the same aspect, implementation, etc., and may mean at least one, one or more, etc.

DETAILED DESCRIPTION

The following detailed description refers to the accompanying drawings. Like reference numbers in different drawings may identify the same or similar features, elements, operations, etc. Additionally, the present disclosure is not limited to the following description as other implementations may be utilized, and structural or logical changes made, without departing from the scope of the present disclosure.

According to the 3GPP New Radio (NR) specification (see, e.g., TS 38.306 section 4.1.4), the network and user equipment (UE) calculate a size for the UE's L2 buffer. The UE allocates memory for the L2 buffer according to calculated buffer size and the network expects that the UE has an L2 buffer of the calculated buffer size. The L2 buffer size is calculated based on a maximum uplink (UL) date rate, a maximum downlink (DL) data rate, and a radio link control (RLC) round trip time (RTT). When dual connectivity is enabled, the calculation of L2 buffer size also takes into account the data rates and RTTs of the secondary node (SN), as well as a queuing time in the master node (MN) and an estimated delay caused by an X2/Xn interface of the MN and the SN.

The calculated buffer size may be based, in many ways, on a worst case scenario. For example, a static RLC RTT used in the calculation is determined based on the smallest subcarrier spacing (SCS) supported in the operating band combination. Peak data rates are used in the calculation rather than the effective throughput, which considers the DL/UL ratio and other overhead. A static X2/Xn delay is also used in the calculation of buffer size. The buffer size is calculated to be higher for the case of split PDCP bearers because recovery from lost packets on both links is taken into consideration.

When UEs support larger L2 buffers, the network can improve capacity with scheduling flexibility for high PDCP data volume applications. However, the potential overestimation of the necessary L2 buffer size may cause an amount of memory to be allocated to the L2 buffer that is much greater than the buffer occupancy that occurs during the majority of operating conditions. As NR operating speeds increase, the resulting calculated L2 buffer size will continue to grow and the UE memory required to support larger L2 buffers will increase, impacting cost and footprint.

Described herein are systems, methods, and circuitries that provide techniques for dynamically allocating memory for the L2 buffer based on current operating conditions, using memory associated with application circuitry as a primary L2 buffer with memory associated with baseband circuitry serving as an overflow L2 buffer, and mitigation measures to be taken when the application L2 buffer becomes full or needs to be reclaimed. In this manner, the L2 buffer size can be estimated in a dynamic and more realistic manner while providing capacity to handle large numbers of out of sync (OOS) packets that may occasionally occur.

Figure 1A:
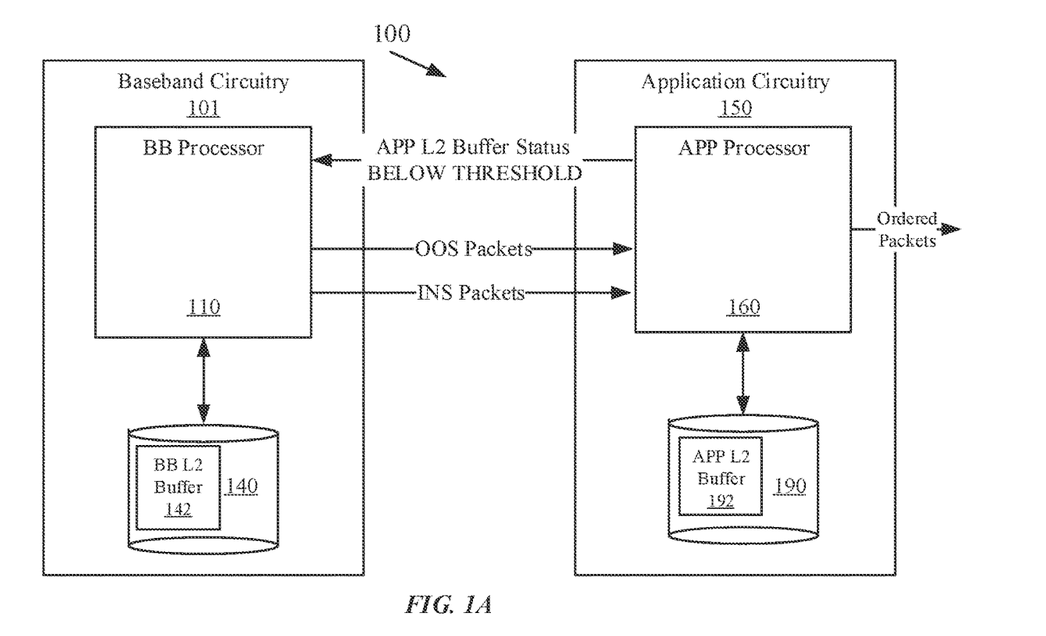
FIGS. 1A and 1B are diagrams illustrating example baseband circuitry and application circuitry that together act as an L2 buffer system operating in two different operating modes, according to one or more implementations described herein.

FIG. 1A illustrates an L2 buffer system 100 that includes baseband circuitry 101 and application circuitry 150 of a user equipment (UE). In some examples, the baseband circuitry 101 and the application circuitry 150 are implemented as a system-on-chip (SoC) in which the baseband circuitry 101 and the application circuitry 150 are implemented in different integrated circuits (ICs) and connected by a communication bus (e.g., Peripheral Component Interconnect Express (PCIE)). In this example, the various disclosed messages communicated between the baseband circuitry 101 and the application circuitry 150 may be PCIE messages communicated on the PCIE bus.

The baseband circuitry 101 includes one or more baseband (BB) processor(s) 110 and BB memory 140. The BB memory 140 may be double data rate (DDR) memory. A portion of the BB memory 140 may be allocated for a BB L2 buffer 142. Similarly, the application circuitry 150 includes one or more application (APP) processor(s) 160 and APP memory 190. The APP memory 190 may be double data rate (DDR) memory. A portion of the APP memory may be allocated for an APP L2 buffer 192.

As will be described in more detail below, in one example, the BB processor 110 executes instructions that implement a BB buffer manager function, a BB policy function, and also a PDCP function. The BB buffer manager function controls the allocation of memory 140 for the BB L2 buffer 142 and also the storing and retrieving of packets to/from the BB L2 buffer 142. The BB policy manager function calculates an L2 buffer size based on real time information as will be described with reference to FIG. 2. The PDCP function coordinates the storing of packets in either the BB L2 buffer 142 or the APP L2 buffer 192 in a dynamic and flexible manner as will be described with reference to FIGS. 3-6.

The application processor 160 implements an AP buffer manager function that controls the allocation of memory 190 for the APP L2 buffer 192. The APP processor 160 also implements an AP policy manager function that coordinates buffer requests from different applications being run by the application circuitry and controls the AP buffer manager function according to prioritization rules for the different applications and types of requests. In the figures, ordered packets are illustrated as being output by the APP processor 160 to a subsequent processing component. It is to be understood that the ordered packets being transferred out of the APP L2 buffer 192 may be provided to a subsequent processing component or operation implemented by the APP processor 160 or a separate processor in the same or different layer of the UE.

In some UE packet processing systems, the baseband circuitry 101 receives data packets being transmitted or received by the UE from a physical layer (PHY) and the PDCP function controls the BB L2 buffer 142 to store and, if necessary, reorder the packets. Packets that are in sequential order (referred to herein as in sequence (INS) packets) are then copied from the BB L2 buffer to the APP L2 buffer 192 for further processing by the APP processor. A state variable RX_DELIV is defined in 3GPP TS 38.323 as indicating the COUNT value (e.g., sequence number) of the first PDCP packet not delivered to upper layers, but still waited for. In one example, for the purposes of this description, a packet is considered to be in sequence if its delivery to upper layers will change the value of RX_DELIV. RX_DELIV is sometimes referred to as the lower edge of the reordering window. For example, if RX_DELIV is SN4, then packet SN4 would be in sequence because delivery of packet SN4 would change RX_DELIV to SN5, while SN6 is out of sequence because it does not change the SN value of the first PDCP packet not yet delivered to the upper layers. A received packet with the highest sequence number defines an upper edge of the reordering window.

While the APP L2 buffer may be sized to store many packets as described above, much of the time the occupancy of the APP L2 buffer 192 is low. The buffer management techniques described herein make better use the APP L2 buffer. As an overview, as illustrated in FIG. 1A, the APP processor 160 (AP buffer manager function) communicates an APP L2 buffer status to the BB processor 110. A threshold is set for the amount of memory in the APP L2 buffer that may be used to store packets. This threshold may be configurable by a network device or by the UE based on current operating conditions (e.g., particular applications currently executing). When the amount of memory in APP L2 buffer consumed by packets exceeds this threshold, the APP L2 buffer may be described herein as being "full." When sufficient (e.g., a threshold amount of) memory is available in the APP L2 buffer (e.g., buffer status=BELOW THRESHOLD), the L2 buffer system operates in a primary mode in which the BB processor (PDCP function) forwards both out of sequence (OOS) and INS packets to the APP processor for storing/reordering in the APP L2 buffer 192. This approach leverages the allocated memory in the APP L2 buffer 192 to avoid the necessity of copying of ordered packets from the BB L2 buffer 142 to the APP L2 buffer 192, reducing overhead.

Figure 1B:
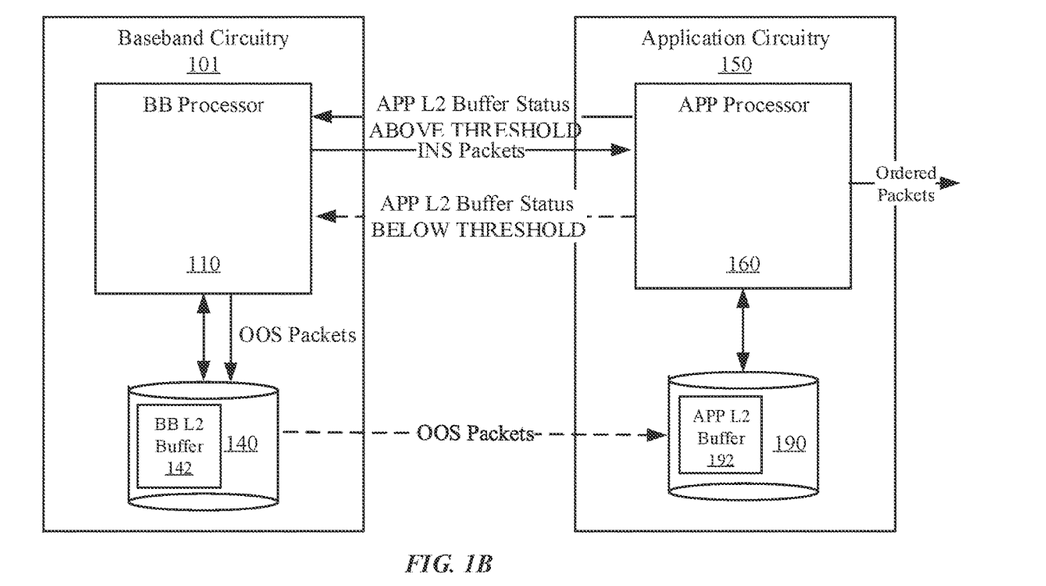

As illustrated in FIG. 1B, when the amount of available memory in the APP L2 buffer becomes too low (e.g., buffer status=ABOVE THRESHOLD), the L2 buffer system operates in a secondary mode in which the BB processor (PDCP function) sends OOS packets to the BB L2 buffer for reordering while continuing to send INS packets to the APP processor for providing to subsequent processing components. The BB processor will continue to operate in the secondary mode of FIG. 1B until the APP processor 160 indicates that the APP L2 buffer has available memory. Thus, when the APP L2 buffer becomes full, the disclosed techniques use the BB L2 buffer 142 as an overflow or fallback buffer to cope with a large influx of OOS packets.

In one example, when the L2 buffer system is operating in the secondary mode and the amount of available memory in the APP L2 buffer reaches the threshold, the BB processor will transition back to the primary mode and also transfer OOS packets from the BB L2 buffer to the APP L2 buffer.

Dynamic Buffer Scaling

Figure 2:
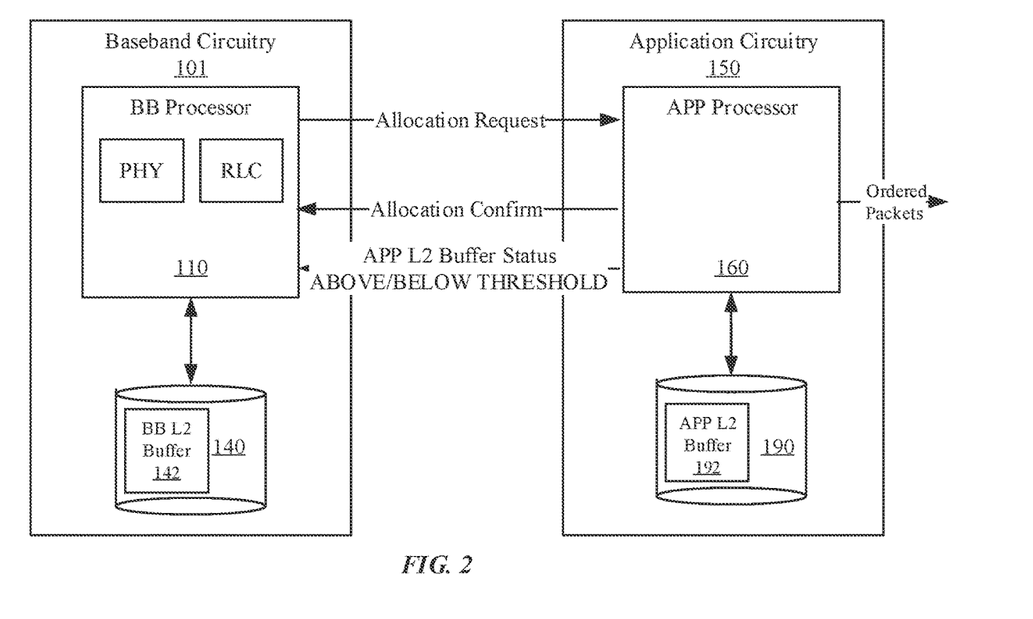
FIG. 2 is a diagram illustrating an example L2 buffer system during an exemplary allocation phase of L2 buffer management, according to one or more implementations described herein.

FIG. 2 illustrates the L2 buffer system of FIG. 1 during an exemplary L2 buffer allocation phase of operation. In one example, the L2 buffer size is calculated by BB processor 110 (e.g., the BB policy manager function) during active data transfer based on a current operational mode of the UE. The physical layer (PHY) periodically provides operating status data indicating, for example, the active component carriers (CCs), active bandwidth parts (BWPs), active radio access technologies (RATs), active multiple input multiple output (MIMO) layers, an active modulation scheme, and/or active frequency ranges. The BB processor 110 determines a maximum data rate based on the operating status data.

The RLC provides RTT interval data that is indicative of an expected RTT based on measurements, computations, or the current operational mode of the UE. The RTT interval data may be a computed real time RLC RTT, a network configured value for the t-Reordering timer, or any other data that correlates with the expected RTT for the specific UE deployment. The BB processor 110 (e.g., the BB policy manager function) computes an L2 buffer size based on the computed data rate and the RTT interval. Since the operating status data and RTT interval data are indicative of the UE's current operational mode, the "worst case" estimate is avoided and a more realistic estimate can be made.

The L2 buffer size may be periodically (re)calculated on a regular or configurable interval or in response to a change in the configured operation of the UE (e.g., different CCs or BWPs, and so on). To (re)configure the APP L2 buffer, the BB processor 110 (e.g., the PDCP function) transmits a request for an APP L2 buffer allocation of the determined L2 buffer size. The requested allocation may include an additional amount of memory over the computed L2 buffer size. For example, a 10% margin may be added to the computed L2 buffer size. In another example the margin is determined based on one or more factors including whether an FR2 link is active.

The APP processor 160 (e.g., the APP buffer manager function) determines if sufficient memory resources are available in the APP memory 190 and, if so, transmits an allocation confirmation message back to the BB processor 110. If insufficient memory resources are available in the APP memory for the full amount of L2 buffer requested, the APP processor may transmit an allocation confirmation message that indicates the (smaller) amount of memory that has been allocated for the APP L2 buffer. The APP processor 160 manages the memory allocated for the APP L2 buffer 192 in accordance with prioritization rules or policies that specify how competing requests for APP memory 190 are to be handled. As will be described with reference to FIGS. 4-6, memory requests from higher priority applications may sometimes impact the APP L2 buffer allocation.

Once the APP processor 160 has configured an allocated amount of the memory 190 for use as the APP L2 buffer 192, the APP processor monitors the occupancy status of the APP L2 buffer and indicates, to the BB processor 110, whether the APP L2 buffer has available capacity (e.g., Buffer Status BELOW THRESHOLD) or does not have available capacity (e.g., Buffer Status ABOVE THRESHOLD). The APP processor may signal a full capacity based when a predetermined threshold amount, which is less than the allocated amount, of memory in the APP L2 buffer is occupied. When the APP L2 buffer status is BELOW THRESHOLD, the L2 buffer system (which includes BB processor 110, APP processor 160, BB L2 buffer 142, and APP L2 buffer 192) operates in the mode illustrated in FIG. 1A. When the APP L2 buffer status is ABOVE THRESHOLD, or the APP processor 160 is unable to allocate sufficient APP memory 190 as an APP L2 buffer, the L2 buffer status operates in the mode illustrated in FIG. 1B.

L2 Buffer System Dynamic Operation

Figure 3A:
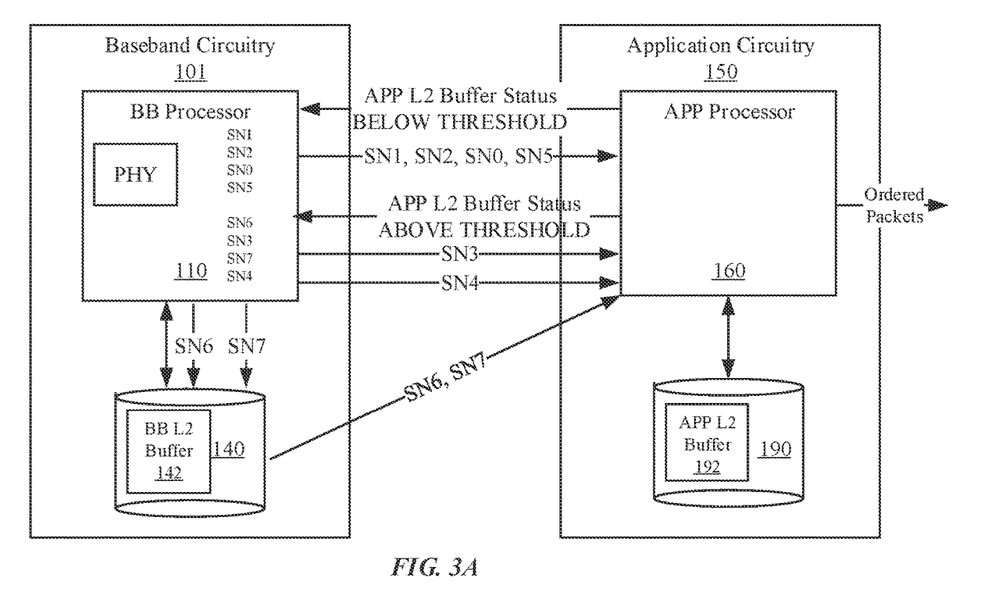
FIGS. 3A and 3B are diagrams illustrating an example L2 buffer system during an exemplary transition between the two different operating modes, according to one or more implementations described herein.

FIG. 3A illustrates the L2 buffer system 100 transitioning between a primary mode (APP L2 buffer status BELOW THRESHOLD) and a secondary mode (APP L2 buffer status ABOVE THRESHOLD) according to one example. The PHY transmits packets in the illustrated chronological order, with packet SN1 being transmitted first and packet SN4 being transmitted last. In the illustrated example, the APP L2 buffer status is BELOW THRESHOLD when the BB processor 110 receives packets SN1, SN2, SN0, and SN5. The BB processor sends these OOS packets to the APP processor 160 for storing and reordering in the APP L2 buffer 192. After storing packet SN5, the APP L2 buffer occupancy reaches the threshold amount and the APP processor 160 sends a message or otherwise indicates to the BB processor 110 (e.g., the PDCP function) that the APP L2 buffer is full. In response, the L2 buffer system operates in the second mode in which OOS packets are transmitted to the BB L2 buffer 142. Thus, OOS packet SN6 is stored in the BB L2 buffer 142 while packet SN3 is sent to the APP L2 buffer 192. Likewise, OOS packet SN7 is stored in the BB L2 buffer 142 while packet SN4 is sent to the APP L2 buffer 192. The L2 buffer system 100 will operate in this secondary mode until the APP L2 buffer status changes to BELOW THRESHOLD (e.g., capacity becomes available).

Expanded INS Packet Definition

Recall that a packet may be considered to be in sequence if its sequence number matches the sequence number of the next packet being waited for (e.g., the value of RX_DELIV or corresponding to the bottom edge of the reordering window). To facilitate increased use of the APP L2 buffer for storing packets for reordering, the definition of INS may be expanded to include packets having a sequence number within a predetermined (and/or configurable) range of sequence numbers with respect to the packet corresponding to a bottom edge of the reordering window. The range may be dynamically increased or decreased depending on current data rates and/or the available memory in the APP L2 buffer to maximize use of the APP L2 buffer for reordering packets.

Figure 3B:
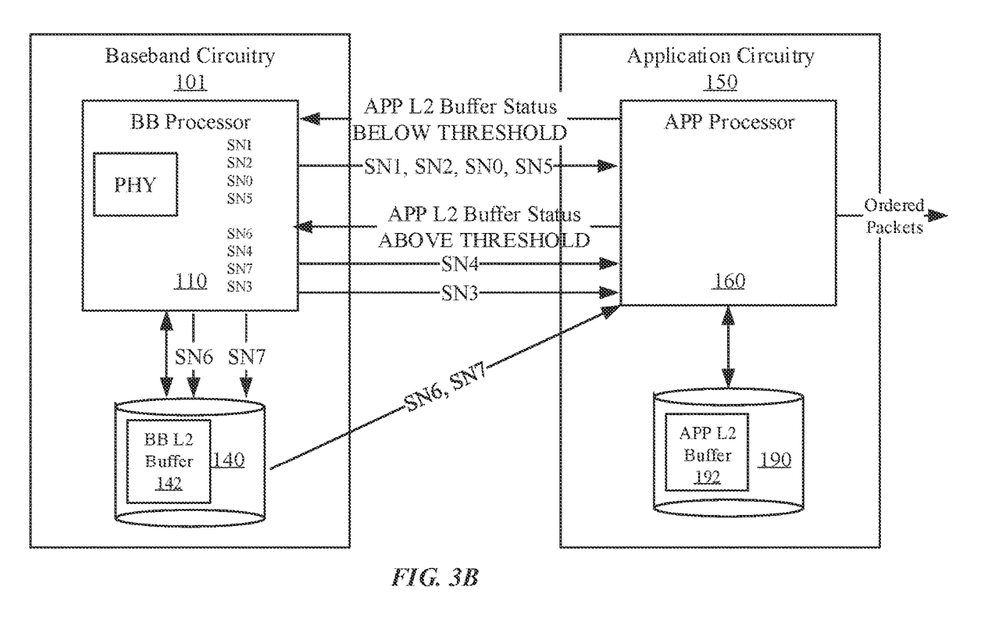

FIG. 3B illustrates an adaptation of the example of FIG. 3A using an expanded definition of INS in which packets that are within 1 sequence number of the packet at the bottom edge of the reordering window are considered INS. The PHY transmits packets in the illustrated chronological order, with packet SN1 being transmitted first and packet SN3 being transmitted last. In the illustrated example, the APP L2 buffer status is BELOW THRESHOLD when the BB processor 110 receives packets SN1, SN2, SN0, and SN5. The BB processor sends these OOS packets to the APP processor 160 for storing and reordering in the APP L2 buffer 192. After storing packet SN5, the APP L2 buffer occupancy reaches the threshold amount and the APP processor 160 sends a message or otherwise indicates to the BB processor 110 (e.g., the PDCP function) that the APP L2 buffer is above threshold. In response, the L2 buffer system operates in the second mode in which OOS packets are transmitted to the BB L2 buffer 142. At this point, the bottom edge of the reordering window is SN3 and the top edge of the reordering window is SN5. Packet SN6 is OOS because its sequence number is 3 sequence numbers away from the sequence number of the packet corresponding to the bottom of the reordering window (SN3) or outside the range. Thus, OOS packet SN6 is stored in the BB L2 buffer 142. Packet SN4 is within the range and is determined as being INS and is sent to the APP L2 buffer 192. Likewise, OOS packet SN7 is stored in the BB L2 buffer 142 and INS packet SN3 is sent to the APP L2 buffer 192.

APP L2 Buffer/BB L2 Buffer Full Mitigation Techniques

At any time during active data transfer, the APP processor (e.g., APP buffer policy manager) may receive requests for surplus memory from higher priority applications. In order to accommodate such asynchronous requests, the APP processor (e.g., APP buffer manager) may reclaim or release a portion of the memory allocated for the APP L2 buffer 192. When the L2 buffer system is operating in the secondary mode, the BB L2 buffer may become full (have an amount of available memory below a threshold). Thus, the BB L2 buffer may need to take mitigation steps to conserve capacity.

Figure 4:
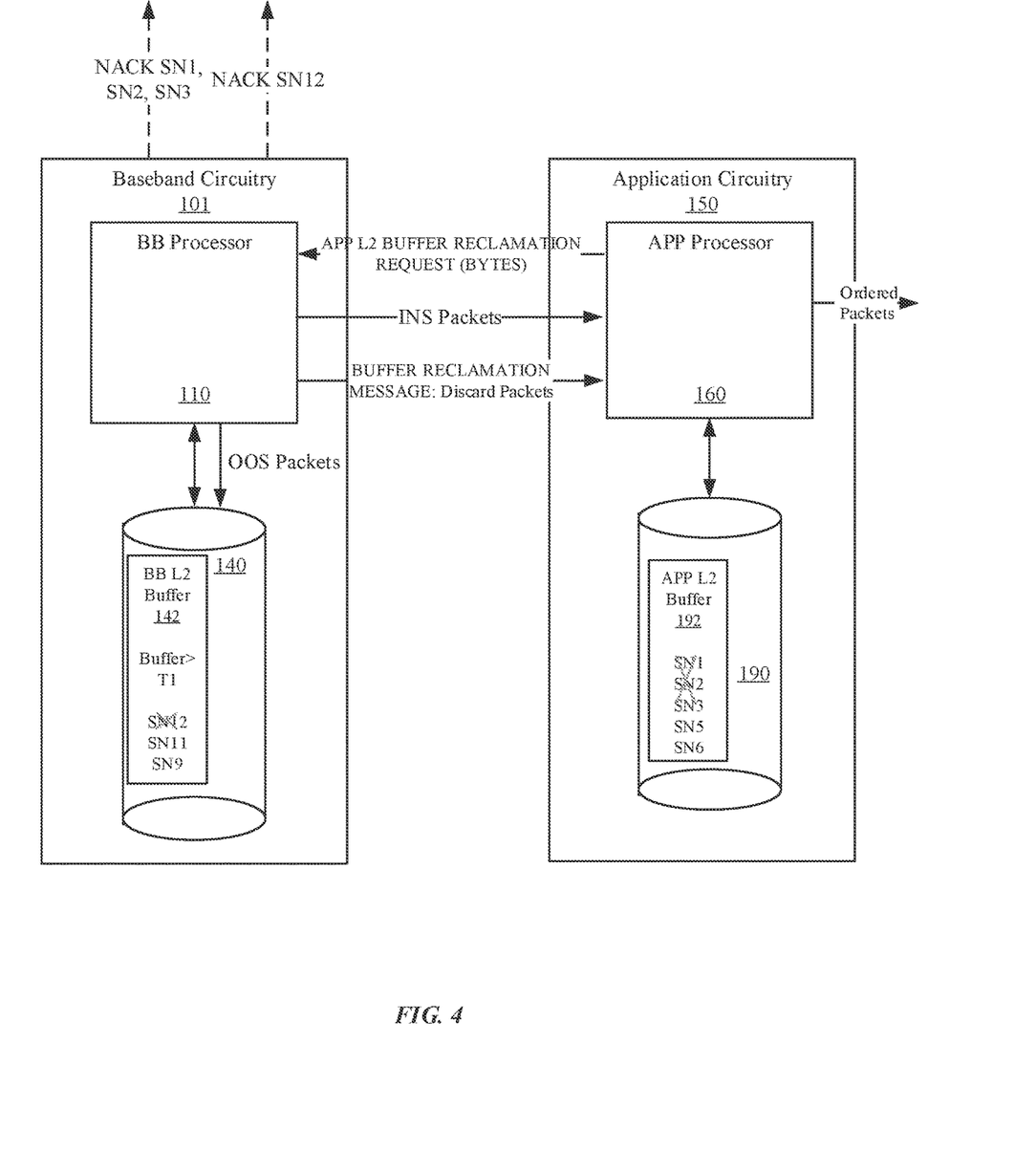
FIG. 4 is a diagram illustrating an example L2 buffer system during a first exemplary buffer reclamation phase, according to one or more implementations described herein.

FIG. 4 illustrates one example technique for reclaiming memory from the APP L2 buffer. The APP processor (e.g., the APP buffer manager function) transmits, to the BB processor (e.g., the PDCP function) an APP L2 buffer reclamation request message that specifies a number of bytes to be reclaimed. The L2 buffer system transitions to the secondary mode and begins sending OOS packets to the BB L2 buffer while continuing to send INS packets to the APP L2 buffer. The BB processor 110 (e.g., the PDCP function) transmits a buffer reclamation message that provides instructions to the APP processor 160 (e.g., the APP buffer manager function) for reclaiming memory allocated to the APP L2 buffer 192. In other examples, the APP processor is preconfigured with a reclamation routine rather than receiving a buffer reclamation message from the BB processor 110.

In the example illustrated in FIG. 4, the buffer reclamation message includes instructions or commands that cause the APP processor 160 to discard OOS packets from the APP L2 buffer until sufficient memory (e.g., the amount of memory specified in the buffer reclamation request) is free to be allocated for other purposes. As shown in FIG. 4, OOS packets SN1, SN2, SN3 (still waiting on SN0) are discarded. The baseband circuitry 101 may indicate to the RLC to NACK packets SN1, SN2, SN3.

FIG. 4 also illustrates one example technique for the BB L2 buffer 142 to free up memory when more than a first threshold amount of memory is storing packets. In the illustrated example, the baseband processor 110 will flush packets at the top of the reordering window (e.g., SN12) from the BB L2 buffer 142 and request retransmission of the TB(s) communicated by the flushed packet(s). In one example the baseband processor requests retransmission of a flushed packet by setting a radio link control (RLC) status protocol data unit (PDU) to non-acknowledge (NACK). In another example the baseband processor requests retransmission of a flushed packet by requesting a media access control (MAC) layer to send a hybrid automatic repeat request (HARQ)-NACK for a TB communicated by the flushed packet.

Figure 5:
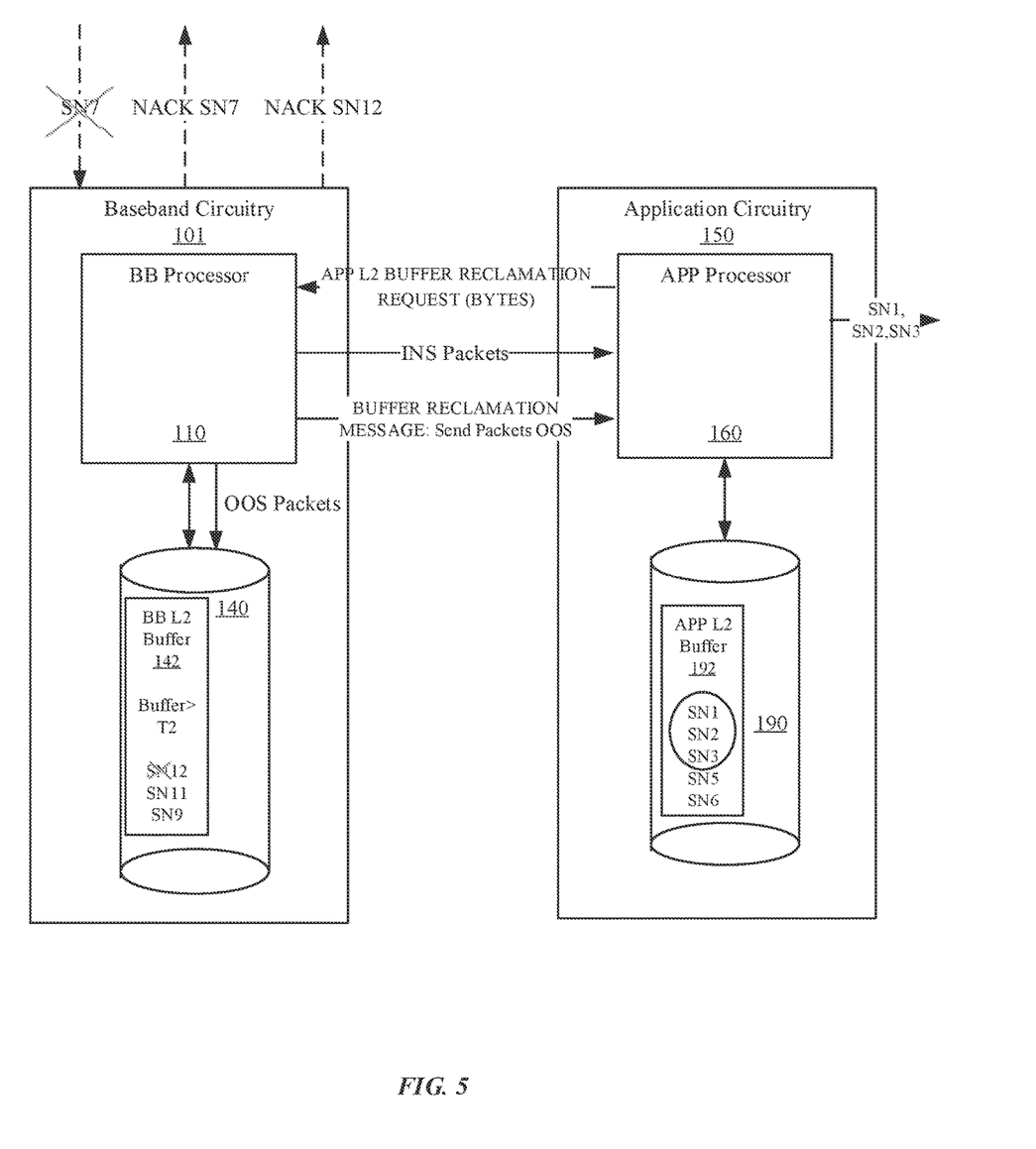
FIG. 5 is a diagram illustrating an example L2 buffer system during a second exemplary buffer reclamation phase, according to one or more implementations described herein.

FIG. 5 illustrates another example technique for reclaiming memory from the APP L2 buffer. The APP processor (e.g., the APP buffer manager function) transmits, to the BB processor (e.g., the PDCP function) an APP L2 buffer reclamation request message that specifies a number of bytes to be reclaimed. The L2 buffer system transitions to the secondary mode and begins sending OOS packets to the BB L2 buffer while continuing to send INS packets to the APP L2 buffer. The BB processor 110 (e.g., the PDCP function) transmits a buffer reclamation message that provides instructions to the APP processor 160 (e.g., the APP buffer manager function) for reclaiming memory allocated to the APP L2 buffer 192. In other examples, the APP processor is preconfigured with a reclamation routine rather than receiving a buffer reclamation message from the BB processor 110.

In the example illustrated in FIG. 5, the buffer reclamation message includes instructions or commands that cause the APP processor 160 to send OOS packets to subsequent processing components until sufficient memory (e.g., the amount of memory specified in the buffer reclamation request) is free to be allocated for other purposes. As shown in FIG. 5, OOS packets SN1, SN2, SN3 (still waiting on SN0) are transmitted based on flow ID (e.g., packets belong to the same TCP/UDP flow).

FIG. 5 also illustrates one example technique for the BB L2 buffer 142 to free up memory when more than a second threshold amount of memory is storing packets. This second threshold may be higher than the first threshold, meaning that the BB L2 buffer is becoming very full. In the illustrated example, the baseband processor 110 will continue to flush packets at the top of the reordering window (e.g., SN12) and request retransmission of the TB(s) communicated by the flushed packet(s) because the consumed memory exceeds the first threshold. In addition, the baseband processor 110 will also refrain from accepting OOS packets (e.g., SN7) while accepting INS packets. The baseband processor will request retransmission of TB(s) communicated by the non-accepted packet(s). In one example the baseband processor requests retransmission of a flushed packet by setting a radio link control (RLC) status protocol data unit (PDU) to non-acknowledge (NACK). In another example the baseband processor requests retransmission of a flushed packet by requesting a media access control (MAC) layer to send a hybrid automatic repeat request (HARQ)-NACK for a TB communicated by the flushed packet.

Figure 6:
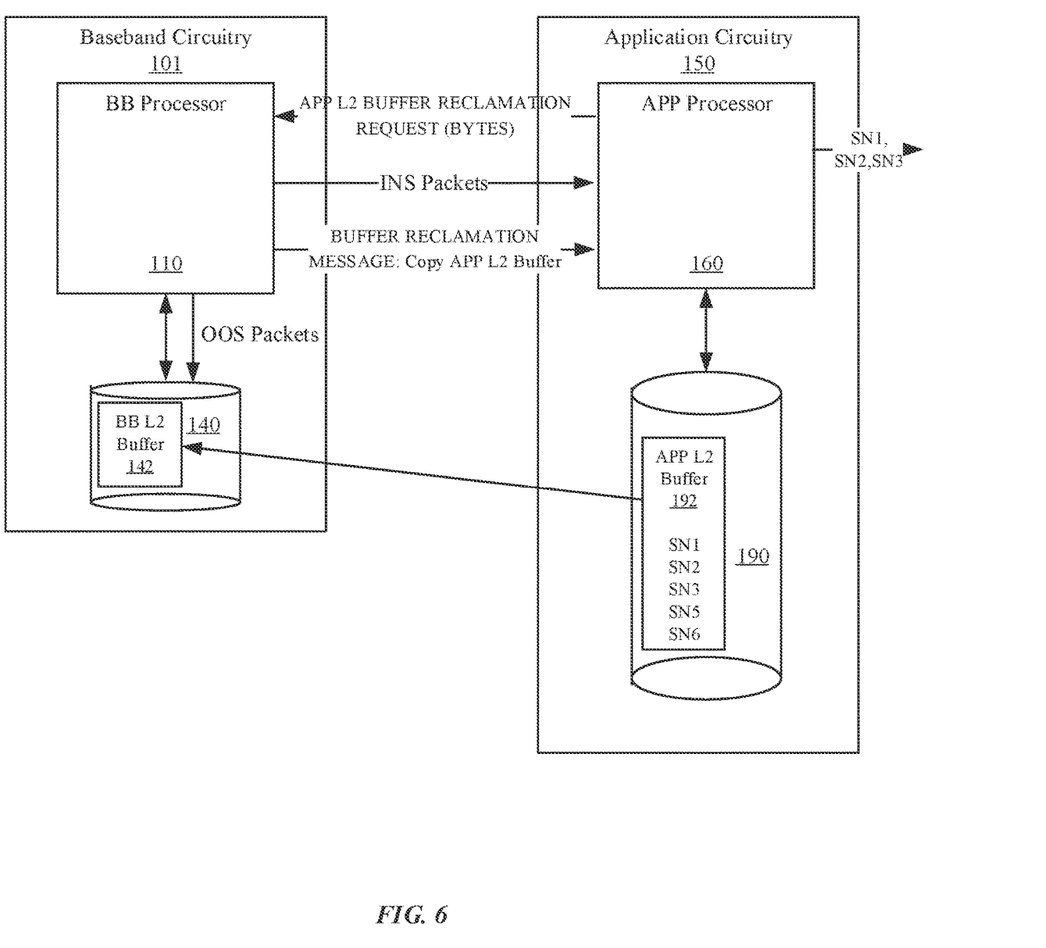
FIG. 6 is a diagram illustrating an example L2 buffer system during a third exemplary buffer reclamation phase, according to one or more implementations described herein.

FIG. 6 illustrates one example technique for reclaiming memory from the APP L2 buffer. The APP processor (e.g., the APP buffer manager function) transmits, to the BB processor (e.g., the PDCP function) an APP L2 buffer reclamation request message that specifies a number of bytes to be reclaimed. The L2 buffer system transitions to the secondary mode and begins sending OOS packets to the BB L2 buffer while continuing to send INS packets to the APP L2 buffer. The BB processor 110 (e.g., the PDCP function) transmits a buffer reclamation message that provides instructions to the APP processor 160 (e.g., the APP buffer manager function) for reclaiming memory allocated to the APP L2 buffer 192. In other examples, the APP processor is preconfigured with a reclamation routine rather than receiving a buffer reclamation message from the BB processor 110.

In the example illustrated in FIG. 6, the buffer reclamation message includes instructions or commands that cause the APP processor 160 to copy the entire contents of the APP L2 buffer 192 to the BB L2 buffer 142. This approach may facilitate providing loss-less delivery of packets when the APP L2 buffer is reclaimed. As shown in FIG. 6, packets SN1, SN2, SN3, SN5, and SN6 are copied to the BB L2 buffer 142.

As can be seen from the foregoing description, the APP L2 buffer may be used as a primary reordering buffer while the BB L2 buffer may be used as an overflow L2 buffer when the APP L2 buffer becomes full or needs to be reclaimed. Further, the L2 buffer size allocation may be determined on real time operating conditions to avoid over-allocating memory to the APP L2 buffer.

Figure 7:
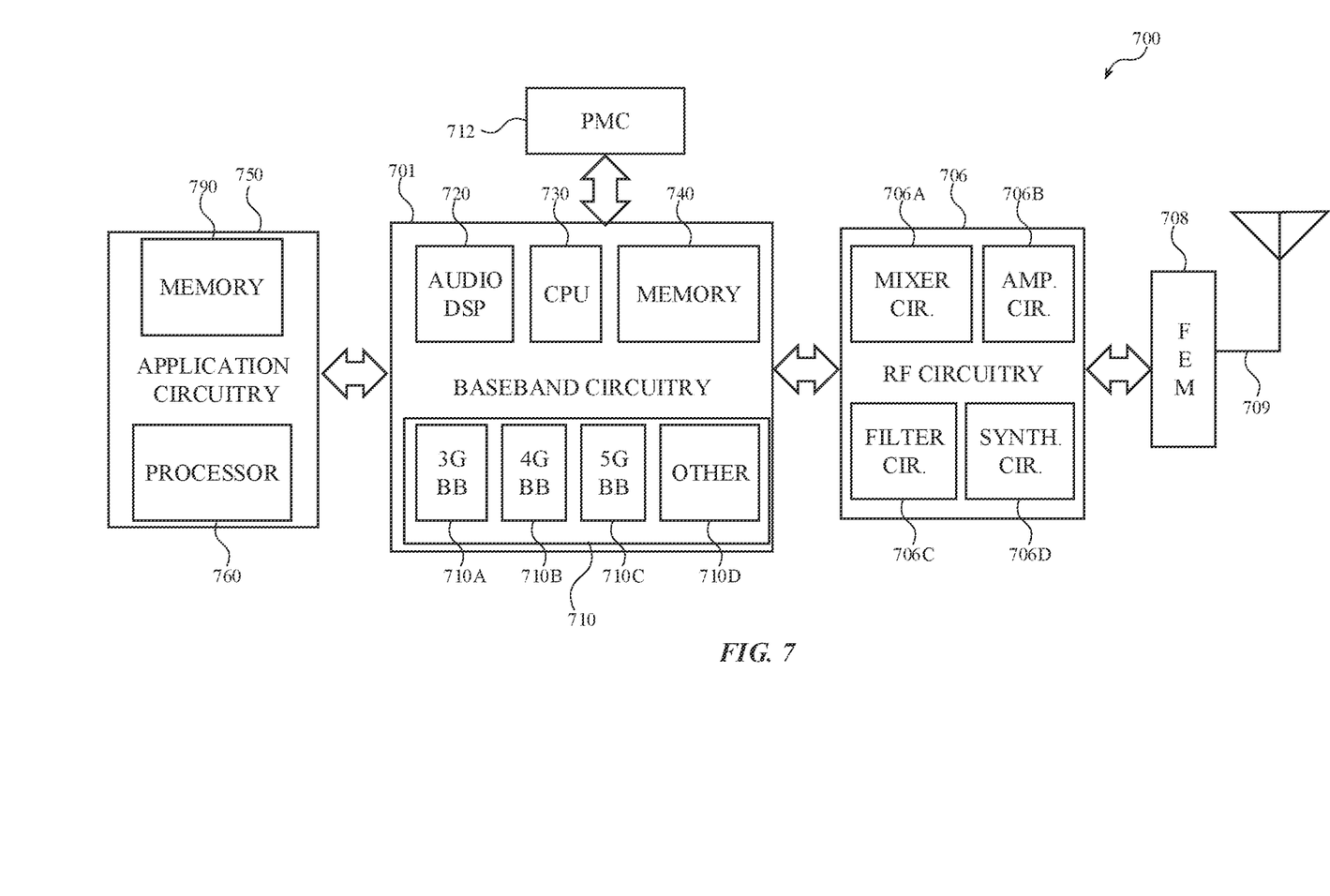
FIG. 7 is a diagram of an example of components of a device according to one or more implementations described herein.

FIG. 7 is a diagram of an example of components of a device according to one or more implementations described herein. In some implementations, the device 700 can include RF circuitry 706, front-end module (FEM) circuitry 708, one or more antennas 709, baseband circuitry 701, power management circuitry (PMC) 712, and application circuitry 750 coupled together at least as shown. The components of the illustrated device 700 can be included in a wireless communication device such as a user equipment (UE) or a radio access network (RAN) node. In some implementations, the device 700 can include fewer elements (e.g., a RAN node may not utilize application circuitry 750, and instead include a processor/controller to process IP data received from a CN such as 5GC 130 or an Evolved Packet Core (EPC)). In some implementations, the device 700 can include additional elements such as, for example, memory/storage, display, camera, sensor (including one or more temperature sensors, such as a single temperature sensor, a plurality of temperature sensors at different locations in device 700, etc.), or input/output (I/O) interface. In other implementations, the components described below can be included in more than one device (e.g., said circuitries can be separately included in more than one device for Cloud-RAN (C-RAN) implementations).

The application circuitry 750 can include one or more application processors 760. For example, the processing circuitry 750 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage 790 and can be configured to execute instructions stored in the memory/storage to enable various applications or operating systems to run on the device 700. As described above, the memory/storage 790 may be used to provide an L2 buffer. In some implementations, processors of application circuitry 750 can process IP data packets received from an EPC.

The baseband circuitry 701 can include circuitry such as, but not limited to, one or more single-core or multi-core processors. The baseband circuitry 701 can include one or more baseband processors or control logic to process baseband signals received from a receive signal path of the RF circuitry 706 and to generate baseband signals for a transmit signal path of the RF circuitry 706. Baseband circuitry 701 can interface with the application circuitry 750 for generation and processing of the baseband signals and for controlling operations of the RF circuitry 706. For example, in some implementations, the baseband circuitry 701 can include one or more baseband processors 710 including, a 3G baseband processor 710A, a 4G baseband processor 710B, a 5G baseband processor 710C, or other baseband processor(s) 710D for other existing generations, generations in development or to be developed in the future (e.g., 2G, 6G, etc.). The baseband processors 710 (e.g., one or more of baseband processors 710A-D) can handle various radio control functions that enable communication with one or more radio networks via the RF circuitry 706. In other implementations, some or all of the functionality of baseband processors 710A-D can be included in modules stored in a memory 740 and executed via a Central Processing Unit (CPU) 730. As described above, the memory 740 may be used to provide an L2 buffer.

The radio control functions can include, but are not limited to, signal modulation/demodulation, encoding/decoding, radio frequency shifting, etc. In some implementations, modulation/demodulation circuitry of the baseband circuitry 701 can include Fast-Fourier Transform (FFT), preceding, or constellation mapping/de-mapping functionality. In some implementations, encoding/decoding circuitry of the baseband circuitry 701 can include convolution, tail-biting convolution, turbo, Viterbi, or Low-Density Parity Check (LDPC) encoder/decoder functionality. Implementations of modulation/demodulation and encoder/decoder functionality are not limited to these examples and can include other suitable functionality in other implementations.

In some implementations, the baseband circuitry 701 can include one or more audio digital signal processor(s) (DSP) 720. The audio DSPs 720 can include elements for compression/decompression and echo cancellation and can include other suitable processing elements in other implementations. Components of the baseband circuitry can be suitably combined in a single chip, a single chipset, or disposed on a same circuit board in some implementations. In some implementations, some or all of the constituent components of the baseband circuitry 701 and the application circuitry 750 can be implemented together such as, for example, on a system on a chip (SOC).

In some implementations, the baseband circuitry 701 can provide for communication compatible with one or more radio technologies. For example, in some implementations, the baseband circuitry 701 can support communication with a NG-RAN, an evolved universal terrestrial radio access network (EUTRAN) or other wireless metropolitan area networks (WMAN), a wireless local area network (WLAN), a wireless personal area network (WPAN), etc. Implementations in which the baseband circuitry 701 is configured to support radio communications of more than one wireless protocol can be referred to as multi-mode baseband circuitry.

RF circuitry 706 can enable communication with wireless networks using modulated electromagnetic radiation through a non-solid medium. In various implementations, the RF circuitry 706 can include switches, filters, amplifiers, etc. to facilitate the communication with the wireless network. RF circuitry 706 can include a receive signal path which can include circuitry to down-convert RF signals received from the FEM circuitry 708 and provide baseband signals to the baseband circuitry 701. RF circuitry 706 can also include a transmit signal path which can include circuitry to up-convert baseband signals provided by the baseband circuitry 701 and provide RF output signals to the FEM circuitry 708 for transmission.

In some implementations, the receive signal path of the RF circuitry 706 can include mixer circuitry 706A, amplifier circuitry 706B and filter circuitry 706C. In some implementations, the transmit signal path of the RF circuitry 706 can include filter circuitry 706C and mixer circuitry 706A. RF circuitry 706 can also include synthesizer circuitry 706d for synthesizing a frequency for use by the mixer circuitry 706A of the receive signal path and the transmit signal path. In some implementations, the mixer circuitry 706A of the receive signal path can be configured to down-convert RF signals received from the FEM circuitry 708 based on the synthesized frequency provided by synthesizer circuitry 706D. The amplifier circuitry 706B can be configured to amplify the down-converted signals and the filter circuitry 706C can be a low-pass filter (LPF) or band-pass filter (BPF) configured to remove unwanted signals from the down-converted signals to generate output baseband signals. Output baseband signals can be provided to the baseband circuitry 701 for further processing. In some implementations, the output baseband signals can be zero-frequency baseband signals, although this is not a requirement. In some implementations, mixer circuitry 706A of the receive signal path can comprise passive mixers, although the scope of the implementations is not limited in this respect.

In some implementations, the mixer circuitry 706A of the transmit signal path can be configured to up-convert input baseband signals based on the synthesized frequency provided by the synthesizer circuitry 706D to generate RF output signals for the FEM circuitry 708. The baseband signals can be provided by the baseband circuitry 701 and can be filtered by filter circuitry 706C.

In some implementations, the mixer circuitry 706A of the receive signal path and the mixer circuitry 706A of the transmit signal path can include two or more mixers and can be arranged for quadrature down conversion and up conversion, respectively. In some implementations, the mixer circuitry 706A of the receive signal path and the mixer circuitry 706A of the transmit signal path can include two or more mixers and can be arranged for image rejection (e.g., Hartley image rejection). In some implementations, the mixer circuitry 706A of the receive signal path and the mixer circuitry' 1406A can be arranged for direct down conversion and direct up conversion, respectively. In some implementations, the mixer circuitry 706A of the receive signal path and the mixer circuitry 706A of the transmit signal path can be configured for super-heterodyne operation.

In some implementations, the output baseband signals, and the input baseband signals can be analog baseband signals, although the scope of the implementations is not limited in this respect. In some alternate implementations, the output baseband signals, and the input baseband signals can be digital baseband signals. In these alternate implementations, the RF circuitry 706 can include analog-to-digital converter (ADC) and digital-to-analog converter (DAC) circuitry and the baseband circuitry 701 can include a digital baseband interface to communicate with the RF circuitry 706.

In some dual-mode implementations, a separate radio IC circuitry can be provided for processing signals for each spectrum, although the scope of the implementations is not limited in this respect.

In some implementations, the synthesizer circuitry 706D can be a fractional-N synthesizer or a fractional N/N+1 synthesizer, although the scope of the implementations is not limited in this respect as other types of frequency synthesizers can be suitable. For example, synthesizer circuitry 706D can be a delta-sigma synthesizer, a frequency multiplier, or a synthesizer comprising a phase-locked loop with a frequency divider.

The synthesizer circuitry 706D can be configured to synthesize an output frequency for use by the mixer circuitry 706A of the RF circuitry 706 based on a frequency input and a divider control input. In some implementations, the synthesizer circuitry 706D can be a fractional N/N+1 synthesizer.

In some implementations, frequency input can be provided by a voltage-controlled oscillator (VCO), although that is not a requirement. Divider control input can be provided by either the baseband circuitry 701 or the application circuitry 750 depending on the desired output frequency. In some implementations, a divider control input (e.g., N) can be determined from a lookup table based on a channel indicated by the application circuitry 750.

Synthesizer circuitry 706D of the RF circuitry 706 can include a divider, a delay-locked loop (DLL), a multiplexer and a phase accumulator. In some implementations, the divider can be a dual modulus divider (DMD) and the phase accumulator can be a digital phase accumulator (DPA). In some implementations, the DMD can be configured to divide the input signal by either N or N+1 (e.g., based on a carry out) to provide a fractional division ratio. In some example implementations, the DLL can include a set of cascaded, tunable, delay elements, a phase detector, a charge pump and a D-type flip-flop. In these implementations, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some implementations, synthesizer circuitry 706D can be configured to generate a carrier frequency as the output frequency, while in other implementations, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some implementations, the output frequency can be a LO frequency (fLO). In some implementations, the RF circuitry 706 can include an IQ/polar converter.

FEM circuitry 708 can include a receive signal path which can include circuitry configured to operate on RF signals received from one or more antennas 709, amplify the received signals and provide the amplified versions of the received signals to the RF circuitry 706 for further processing. FEM circuitry 708 can also include a transmit signal path which can include circuitry configured to amplify signals for transmission provided by the RF circuitry 706 for transmission by one or more of the one or more antennas 709. In various implementations, the amplification through the transmit or receive signal paths can be done solely in the RF circuitry 706, solely in the FEM circuitry 708, or in both the RF circuitry 706 and the FEM circuitry 708.

In some implementations, the FEM circuitry 708 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 706). The transmit signal path of the FEM circuitry 708 can include a power amplifier (PA) to amplify input RF signals (e.g., provided by RF circuitry 706), and one or more filters to generate RF signals for subsequent transmission (e.g., by one or more of the one or more antennas 709.

In some implementations, the PMC 712 can manage power provided to the baseband circuitry 701. In particular, the PMC 712 can control power-source selection, voltage scaling, battery charging, or DC-to-DC conversion. The PMC 712 can often be included when the device 700 is capable of being powered by a battery, for example, when the device is included in a UE. The PMC 712 can increase the power conversion efficiency while providing desirable implementation size and heat dissipation characteristics.

While FIG. 7 shows the PMC 712 coupled only with the baseband circuitry 701. In other implementations, the PMC 712 may be additionally or alternatively coupled with, and perform similar power management operations for, other components such as, but not limited to, application circuitry 750, RF circuitry 706, or FEM circuitry 708.

In some implementations, the PMC 712 can control, or otherwise be part of, various power saving mechanisms of the device 700. For example, if the device 700 is in an RRC_Connected state, where it is still connected to the RAN node as it expects to receive traffic shortly, then it can enter a state known as Discontinuous Reception Mode (DRX) after a period of inactivity. During this state, the device 700 can power down for brief intervals of time and thus save power.

If there is no data traffic activity for an extended period of time, then the device 700 can transition off to an RRC_Idle state, where it disconnects from the network and does not perform operations such as channel quality feedback, handover, etc. The device 700 goes into a very low power state and it performs paging where again it periodically wakes up to listen to the network and then powers down again. The device 700 may not receive data in this state; in order to receive data, it can transition back to RRC_Connected state.

An additional power saving mode can allow a device to be unavailable to the network for periods longer than a paging interval (ranging from seconds to a few hours). During this time, the device is totally unreachable to the network and can power down. Any data sent during this time incurs a large delay and it is assumed the delay is acceptable.

Processors of the application circuitry 750 and processors of the baseband circuitry 701 can be used to execute elements of one or more instances of a protocol stack. For example, processors of the baseband circuitry 701, alone or in combination, can be used execute Layer 3, Layer 2, or Layer 1 functionality, while processors of the baseband circuitry 701 can utilize data (e.g., packet data) received from these layers and further execute Layer 4 functionality (e.g., transmission communication protocol (TCP) and user datagram protocol (UDP) layers). As referred to herein, Layer 3 can comprise a RRC layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

As used herein, terms "module", "component," "system," "circuit," "element," "slice," "circuitry," and the like are intended to refer to a set of one or more electronic components, a computer-related entity, hardware, software (e.g., in execution), and/or firmware. For example, circuitry or a similar term can be a processor, a process running on a processor, a controller, an object, an executable program, a storage device, and/or a computer with a processing device.

By way of illustration, an application running on a server and the server can also be circuitry. One or more circuits can reside within the same circuitry, and circuitry can be localized on one computer and/or distributed between two or more computers. A set of elements or a set of other circuits can be described herein, in which the term "set" can be interpreted as "one or more."

Above are several flow diagrams outlining example methods. In this description and the appended claims, use of the term "determine" with reference to some entity (e.g., parameter, variable, and so on) in describing a method step or function is to be construed broadly. For example, "determine" is to be construed to encompass, for example, receiving and parsing a communication that encodes the entity or a value of an entity. "Determine" should be construed to encompass accessing and reading memory (e.g., lookup table, register, device memory, remote memory, and so on) that stores the entity or value for the entity. "Determine" should be construed to encompass calculating, computing or deriving the entity or value of the entity based on other quantities or entities. "Determine" should be construed to encompass any manner of deducing or identifying an entity or value of the entity.

As used herein, the term identify when used with reference to some entity or value of an entity is to be construed broadly as encompassing any manner of determining the entity or value of the entity. For example, the term identify is to be construed to encompass, for example, receiving and parsing a communication that encodes the entity or a value of the entity. The term identify should be construed to encompass accessing and reading memory (e.g., device queue, lookup table, register, device memory, remote memory, and so on) that stores the entity or value for the entity.

As used herein, the term indicate is to be construed broadly as identifying an item, value, or quantity, to another component. For example, indicate may mean communicating a selection of one option among a preconfigured set of options, or setting a flag or bit value in a field of a communicated signal (e.g., PCIE, DCI, UCI).

EXAMPLES

Examples herein can include subject matter such as a method, means for performing acts or blocks of the method, at least one machine-readable medium including executable instructions that, when performed by a machine or circuitry (e.g., a processor (e.g., processor, etc.) with memory, an application-specific integrated circuit (ASIC), a field programmable gate array (FPGA), or the like) cause the machine to perform acts of the method or of an apparatus or system for concurrent communication using multiple communication technologies according to implementations and examples described.

Example 1 is a baseband circuitry of a user equipment (UE), including BB memory, configured as a BB Layer 2 (L2 buffer); and one or more baseband (BB) processors configured to receive an out of sequence (OOS) packet from a physical layer (PHY); and in response to an APP L2 buffer status indicating at least a first amount of memory is available, sending the OOS packet to APP circuitry for storing in an APP L2 buffer.

Example 2 includes the subject matter of example 1, including or omitting optional elements, wherein the baseband circuitry is configured to determine a packet to be an OOS packet if a sequence number of the packet is outside a range with respect to the sequence number of a packet that corresponds to a lower edge of a reordering window; and determine a packet to be an in sequence (INS) packet if a sequence number of the packet is within the range with respect to the sequence number of the packet that corresponds to the lower edge of the reordering window, wherein the range includes at least one sequence number.

Example 3 includes the subject matter of example 2, including or omitting optional elements, wherein the range is dynamically configured based on current data rates or occupancy of the APP L2 buffer.

Example 4 includes the subject matter of example 1, including or omitting optional elements, wherein the one or more BB processors are configured to, in response to the APP L2 status indicating less than the first amount of memory is available, store the OOS packet in the baseband (BB) L2 buffer; and transmit in sequence (INS) packets to the APP circuitry for storing in the APP L2 buffer.

Example 5 includes the subject matter of example 4, including or omitting optional elements, wherein the baseband circuitry is configured to in response to a subsequent APP L2 buffer status indicating that at least the first amount of memory is available, send OOS packets from the BB L2 buffer to the APP L2 buffer.

Example 6 includes the subject matter of example 4, including or omitting optional elements, wherein the baseband circuitry is configured to, in response to the BB L2 buffer storing more than a second amount of memory, flush packets from the BB L2 buffer that have a sequence number closest to a packet corresponding to an upper edge of a reordering window; and request retransmission of the flushed packets.

Example 7 includes the subject matter of example 6, including or omitting optional elements, wherein the baseband circuitry is configured to request retransmission of a flushed packet by setting a radio link control (RLC) status protocol data unit (PDU) to non-acknowledge (NACK).

Example 8 includes the subject matter of example 6, including or omitting optional elements, wherein the baseband circuitry is configured to request retransmission of a flushed packet by requesting a media access control (MAC) layer to send a hybrid automatic repeat request (HARQ)-NACK for a TB communicated by the flushed packet.

Example 9 includes the subject matter of example 6, including or omitting optional elements, wherein the baseband circuitry is configured to, in response to the BB L2 buffer storing more than a third amount of memory, accept INS packets; refrain from accepting OOS packets; and request retransmission of the OOS packets.

Example 10 includes the subject matter of example 9, including or omitting optional elements, wherein the baseband circuitry is configured to request transmission of an OOS packet that was not accepted by setting a radio link control (RLC) status protocol data unit (PDU) to non-acknowledge (NACK).

Example 11 includes the subject matter of example 9, including or omitting optional elements, wherein the baseband circuitry is configured to request transmission of an OOS packet that was not accepted by requesting a media access control (MAC) layer to send a hybrid automatic repeat request (HARQ)-NACK for a TB communicated by the flushed packet.

Example 12 includes the subject matter of example 1, including or omitting optional elements, wherein one or more BB processors are configured to determine the APP L2 buffer status based on a Peripheral Component Interconnect Express (PCIE) message received from the APP circuitry.

Example 13 includes the subject matter of example 1, including or omitting optional elements, wherein the one or more BB processors are configured to receive a buffer reclamation request from the APP circuitry, wherein the buffer reclamation request indicates an amount of memory to be reclaimed; and in response, transmit a buffer reclamation message to the APP circuitry.

Example 14 includes the subject matter of example 13, including or omitting optional elements, wherein the buffer reclamation message is configured to cause the APP circuitry to send OOS packets to a subsequent processing component until the amount of memory in the APP L2 buffer is available.

Example 15 includes the subject matter of example 13, including or omitting optional elements, wherein the buffer reclamation message is configured to cause the APP circuitry to discard OOS packets until the amount of memory in the APP L2 buffer is available and wherein the one or more BB processors are configured to cause a radio link control (RLC) function to transmit a non-acknowledgment message (NACK) for discarded OOS packets.

Example 16 includes the subject matter of example 13, including or omitting optional elements, wherein the buffer reclamation message is configured to cause the APP circuitry to copy contents of the APP L2 buffer to the BB L2 buffer.

Example 17 includes the subject matter of example 13, including or omitting optional elements, wherein the buffer reclamation message includes a PCIE message.

Example 18 includes the subject matter of example 1, including or omitting optional elements, wherein the one or more BB processors are configured to determine an L2 buffer size based on a current operational mode of the UE; and transmit, to the APP circuitry, a request for an APP L2 buffer allocation of the determined L2 buffer size; and in response to receiving confirmation of an APP L2 buffer allocation, sending OOS packets to the APP circuitry for storing in the APP L2 buffer.

Example 19 includes the subject matter of example 18, including or omitting optional elements, wherein the one or more BB processors are configured to receive operating status data indicative of a current operational mode of the UE; determine a maximum data rate based on the operating status data; receive round trip time (RTT) interval data indicative of an expected RTT based on the current operational mode of the UE; and determine the L2 buffer size based on the maximum data rate and the RTT interval data.

Example 20 includes the subject matter of example 19, including or omitting optional elements, wherein the operating status data includes one or more of active component carriers (CCs), active bandwidth parts (BWPs), active radio access technologies (RATs), active multiple input multiple output (MIMO) layers, an active modulation scheme, or active frequency ranges.

Example 21 includes the subject matter of example 19, including or omitting optional elements, wherein the baseband circuitry is wherein the RTT interval data includes a configured value for t-Reordering timer.

Example 22 includes the subject matter of example 19, including or omitting optional elements, wherein the RTT interval data includes a real time RTT interval computed by a radio link control (RLC) function.

Example 23 is a baseband circuitry of a user equipment (UE), including one or more baseband (BB) processors configured to determine an L2 buffer size based on a current operational mode of the UE; and cause an allocation of memory for an L2 buffer in an application memory based on the determined L2 buffer size.

Example 24 includes the subject matter of example 23, including or omitting optional elements, wherein the one or more BB processors are configured to transmit, to application circuitry, a request for an APP L2 buffer allocation of the determined L2 buffer size; and in response to receiving confirmation of an APP L2 buffer allocation, sending OOS packets to the APP circuitry for storing in the APP L2 buffer.

Example 25 includes the subject matter of example 24, including or omitting optional elements, wherein the baseband circuitry is configured to determine a packet to be an OOS packet if a sequence number of the packet is outside a range with respect to the sequence number of a packet that corresponds to a lower edge of a reordering window; and determine a packet to be an in sequence (INS) packet if a sequence number of the packet is within the range with respect to the sequence number of the packet that corresponds to the lower edge of the reordering window, wherein the range includes at least one sequence number.

Example 26 includes the subject matter of example 23, including or omitting optional elements, wherein the one or more BB processors are configured to receive operating status data indicative of a current operational mode of the UE; determine a maximum data rate based on the operating status data; receive round trip time (RTT) interval data indicative of an expected RTT based on the current operational mode of the UE; and determine the L2 buffer size based on the maximum data rate and the RTT interval data.

Example 24 includes the subject matter of example 26, including or omitting optional elements, wherein the operating status data includes one or more of active component carriers (CCs), active bandwidth parts (BWPs), active radio access technologies (RATs), active multiple input multiple output (MIMO) layers, an active modulation scheme, or active frequency ranges.

Example 28 includes the subject matter of example 26, including or omitting optional elements, wherein the RTT interval data includes a configured value for t-Reordering timer.

Example 29 includes the subject matter of example 26, including or omitting optional elements, wherein the baseband circuitry is wherein the RTT interval data includes a real time RTT interval computed by a radio link control (RLC) function.

Example 30 includes the subject matter of example 23, including or omitting optional elements, wherein the one or more BB processors are configured to determine that the current operational mode of the UE has changed; and in response, determine a new L2 buffer size.

Example 31 is baseband circuitry of a user equipment (UE), including one or more baseband (BB) processors configured to cause storage of OOS packets in an APP L2 buffer associated with APP circuitry; receive a buffer reclamation request from APP circuitry, wherein the buffer reclamation request indicates an amount of memory to be reclaimed; and in response, transmit a buffer reclamation message to the APP circuitry.

Example 32 includes the subject matter of example 31, including or omitting optional elements, wherein the baseband circuitry is configured to determine a packet to be an OOS packet if a sequence number of the packet is outside a range with respect to the sequence number of a packet that corresponds to a lower edge of a reordering window; and determine a packet to be an in sequence (INS) packet if a sequence number of the packet is within the range with respect to the sequence number of the packet that corresponds to the lower edge of the reordering window, wherein the range includes at least one sequence number.

Example 33 includes the subject matter of example 31, including or omitting optional elements, wherein the baseband circuitry is wherein the buffer reclamation message is configured to cause the APP circuitry to send OOS packets to a subsequent processing component until the amount of memory in the APP L2 buffer is available.

Example 34 includes the subject matter of example 31, including or omitting optional elements, wherein the buffer reclamation message is configured to cause the APP circuitry to discard OOS packets until the amount of memory in the APP L2 buffer is available and wherein the one or more BB processors are configured to indicate to a radio link control (RLC) function to transmit a non-acknowledgment message (NACK) for discarded OOS packets.

Example 35 includes the subject matter of example 31, including or omitting optional elements, wherein the buffer reclamation message is configured to cause the APP circuitry to copy contents of the APP L2 buffer to a BB L2 buffer.

Example 36 includes the subject matter of example 31, including or omitting optional elements, wherein the buffer reclamation message includes a PCIE message.

Example 37 is application circuitry of a user equipment (UE), including application (APP) memory configurable as an APP Layer 2 (L2) buffer; and an APP processor, configured to receive out of sequence (OOS) packets from baseband (BB) circuitry; and store and reorder the OOS packets; and transmit in sequence (INS) packets or indications of INS packets from the APP L2 buffer to subsequent processing components.

Example 38 includes the subject matter of example 37, including or omitting optional elements, wherein the APP processor is configured to receive a request for L2 buffer allocation of a requested APP L2 buffer size from the BB circuitry; in response, based on the requested APP L2 buffer size, allocate a portion of the APP memory as the APP L2 buffer; and transmit a message to the BB circuitry indicating an amount of memory allocated to the APP L2 buffer.

Example 39 includes the subject matter of example 37, including or omitting optional elements, wherein the APP processor is configured to transmit a message indicative of a status of the APP L2 buffer to the BB circuitry, wherein the message indicates that the APP L2 buffer has sufficient capacity to store more OOS packets or does not have sufficient capacity to store more OOS packets.

Example 40 includes the subject matter of example 37, including or omitting optional elements, wherein the APP processor is configured to receive a request for allocation of an amount of memory in the APP memory; in response, transmit a buffer reclamation request indicating the amount of memory to the BB circuitry; and receive a buffer reclamation message from the BB circuitry that indicates instructions for processing OOS packets in the APP L2 buffer to reclaim the amount of memory.

Example 41 includes the subject matter of example 40, including or omitting optional elements, wherein the buffer reclamation message is configured to cause the APP circuitry to send OOS packets to a subsequent processing component until the amount of memory in the APP L2 buffer is available.

Example 42 includes the subject matter of example 40, including or omitting optional elements, wherein the buffer reclamation message is configured to cause the APP circuitry to discard OOS packets until the amount of memory in the APP L2 buffer is available and wherein the one or more BB processors are configured to indicate to a radio link control (RLC) function to transmit a non-acknowledgment message (NACK) for discarded OOS packets.

Example 43 includes the subject matter of example 40, including or omitting optional elements, wherein the buffer reclamation message is configured to cause the APP circuitry to copy contents of the APP L2 buffer to a BB L2 buffer.

Example 44 is a baseband circuitry of a user equipment (UE), including BB memory, configured as a BB Layer 2 (L2 buffer); and one or more baseband (BB) processors configured to, in response to the BB L2 buffer storing more than a second amount of memory, flush packets from the BB L2 buffer that have a sequence number closest to a packet corresponding to an upper edge of a reordering window; and request retransmission of the flushed packets.

Example 45 includes the subject matter of example 44, including or omitting optional elements, wherein the baseband circuitry is configured to request retransmission of a flushed packet by setting a radio link control (RLC) status protocol data unit (PDU) to non-acknowledge (NACK).

Example 46 includes the subject matter of example 44, including or omitting optional elements, wherein the baseband circuitry is configured to request retransmission of a flushed packet by requesting a media access control (MAC) layer to send a hybrid automatic repeat request (HARQ)-NACK for a TB communicated by the flushed packet.

Example 47 includes the subject matter of example 44, including or omitting optional elements, wherein the baseband circuitry is configured to determine a packet to be an OOS packet if a sequence number of the packet is outside a range with respect to the sequence number of a packet that corresponds to a lower edge of a reordering window; and determine a packet to be an in sequence (INS) packet if a sequence number of the packet is within the range with respect to the sequence number of the packet that corresponds to the lower edge of the reordering window, wherein the range includes at least one sequence number.

Example 48 is baseband circuitry of a user equipment (UE), including BB memory, configured as a BB Layer 2 (L2 buffer); and one or more baseband (BB) processors configured to, in response to the BB L2 buffer storing more than a second amount of memory, accept INS packets; refrain from accepting OOS packets; and request retransmission of the OOS packets.

Example 49 includes the subject matter of example 48, including or omitting optional elements, wherein the baseband circuitry is configured to request transmission of an OOS packet that was not accepted by setting a radio link control (RLC) status protocol data unit (PDU) to non-acknowledge (NACK).

Example 50 includes the subject matter of example 48, including or omitting optional elements, wherein the baseband circuitry is configured to determine a packet to be an OOS packet if a sequence number of the packet is outside a range with respect to the sequence number of a packet that corresponds to a lower edge of a reordering window; and determine a packet to be an in sequence (INS) packet if a sequence number of the packet is within the range with respect to the sequence number of the packet that corresponds to the lower edge of the reordering window, wherein the range includes at least one sequence number.

The above description of illustrated examples, implementations, aspects, etc., of the subject disclosure, including what is described in the Abstract, is not intended to be exhaustive or to limit the disclosed aspects to the precise forms disclosed. While specific examples, implementations, aspects, etc., are described herein for illustrative purposes, various modifications are possible that are considered within the scope of such examples, implementations, aspects, etc., as those skilled in the relevant art can recognize.

In this regard, while the disclosed subject matter has been described in connection with various examples, implementations, aspects, etc., and corresponding Figures, where applicable, it is to be understood that other similar aspects can be used or modifications and additions can be made to the disclosed subject matter for performing the same, similar, alternative, or substitute function of the subject matter without deviating therefrom. Therefore, the disclosed subject matter should not be limited to any single example, implementation, or aspect described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

As used herein, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items can be distinct, or they can be the same, although in some situations the context may indicate that they are distinct or that they are the same.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. Baseband circuitry of a user equipment (UE), comprising:
   baseband (BB) memory, configured as a BB Layer 2 (L2) buffer; and
   one or more baseband (BB) processors configured to:
   receive an out of sequence (OOS) packet from a physical layer (PHY); and
   in response to an application (APP) Layer 2 (L2) buffer status indicating at least a first amount of memory is available, send the OOS packet to an application (APP) circuitry for storing in an APP L2 buffer.

2. The baseband circuitry of claim 1, configured to
   determine a packet to be an OOS packet if the sequence number of the packet is outside a range with respect to the sequence number of a packet that corresponds to a lower edge of a reordering window; and
   determine a packet to be an in sequence (INS) packet if the sequence number of the packet is within the range with respect to the sequence number of the packet that corresponds to the lower edge of the reordering window, wherein the range comprises at least one sequence number.

3. The baseband circuitry of claim 2, wherein the range is dynamically configured based on current data rates or occupancy of the APP L2 buffer.

4. The baseband circuitry of claim 1, wherein the one or more BB processors are configured to, in response to the APP L2 status indicating less than the first amount of memory is available,
   store the OOS packet in the baseband (BB) L2 buffer; and
   transmit in sequence (INS) packets to the APP circuitry for storing in the APP L2 buffer.

5. The baseband circuitry of claim 4, configured to
   in response to a subsequent APP L2 buffer status indicating that at least the first amount of memory is available, send OOS packets from the BB L2 buffer to the APP L2 buffer.

6. The baseband circuitry of claim 4, configured to, in response to the BB L2 buffer storing more than a second amount of memory,
   flush packets from the BB L2 buffer that have a sequence number closest to a packet corresponding to an upper edge of a reordering window; and
   request retransmission of the flushed packets.

7. The baseband circuitry of claim 6, configured to request retransmission of a flushed packet by setting a radio link control (RLC) status protocol data unit (PDU) to non-acknowledge (NACK).

8. The baseband circuitry of claim 6, configured to request retransmission of a flushed packet by requesting a media access control (MAC) layer to send a hybrid automatic repeat request (HARQ)-NACK for a transmission block (TB) communicated by the flushed packet.

9. The baseband circuitry of claim 6, configured to, in response to the BB L2 buffer storing more than a third amount of memory,
accept INS packets;
refrain from accepting OOS packets; and
request retransmission of the OOS packets.

10. Baseband circuitry of a user equipment (UE), comprising baseband (BB) memory; and
one or more baseband (BB) processors configured to:
determine Layer (L2) buffer size based on a current operational mode of the UE; and
cause an allocation of memory for a Layer (L2) buffer in an application memory based on the determined L2 buffer size.

11. The baseband circuitry of claim 10, wherein the one or more BB processors are configured to:
receive operating status data indicative of a current operational mode of the UE;
determine a maximum data rate based on the operating status data;
receive round trip time (RTT) interval data indicative of an expected RTT based on the current operational mode of the UE; and
determine the L2 buffer size based on the maximum data rate and the RTT interval data.

12. The baseband circuitry of claim 11, wherein the operating status data includes one or more of active component carriers (CCs), active bandwidth parts (BWPs), active radio access technologies (RATs), active multiple input multiple output (MIMO) layers, an active modulation scheme, or active frequency ranges.

13. The baseband circuitry of claim 11, wherein the RTT interval data comprises a configured value for t-Reordering timer.

14. The baseband circuitry of claim 11, wherein the RTT interval data comprises a real time RTT interval computed by a radio link control (RLC) function.

15. The baseband circuitry of claim 10, wherein the one or more BB processors are configured to
determine that the current operational mode of the UE has changed; and
in response, determine a new L2 buffer size.

16. Baseband circuitry of a user equipment (UE), comprising baseband (BB) memory; and
one or more baseband (BB) processors configured to:
cause storage of OOS out of sequence (OOS) packets in an application (APP) Layer 2 (L2) buffer associated with an application (APP) circuitry;
receive a buffer reclamation request from the APP circuitry, wherein the buffer reclamation request indicates an amount of memory to be reclaimed; and
in response, transmit a buffer reclamation message to the APP circuitry.

17. The baseband circuitry of claim 16, wherein the buffer reclamation message is configured to cause the APP circuitry to send OOS packets to a subsequent processing component until the amount of memory in the APP L2 buffer is available.

18. The baseband circuitry of claim 16, wherein the buffer reclamation message is configured to cause the APP circuitry to discard OOS packets until the amount of memory in the APP L2 buffer is available and wherein the one or more BB processors are configured to indicate to a radio link control (RLC) function to transmit a non-acknowledgment message (NACK) for discarded OOS packets.

19. The baseband circuitry of claim 16, wherein the buffer reclamation message is configured to cause the APP circuitry to copy contents of the APP L2 buffer to a BB L2 buffer.

20. The baseband circuitry of claim 16, wherein the buffer reclamation message comprises a Peripheral Component Interconnect Express (PCIE) message.

* * * * *